United States Patent [19]

Moll, Jr. et al.

[11] 4,240,951

[45] Dec. 23, 1980

[54] RHEOLOGICAL CONTROL OF POLYESTER-STYRENE RESIN COMPOSITIONS

[75] Inventors: William F. Moll, Jr., Summit; Thomas D. Thompson, III, Flemington, both of N.J.

[73] Assignee: Yara Engineering Corporation, Elizabeth, N.J.

[21] Appl. No.: 643,797

[22] Filed: Dec. 23, 1975

[51] Int. Cl.$^3$ .............................................. C08K 3/00
[52] U.S. Cl. ............................ 260/40 R; 106/308 N
[58] Field of Search ................. 260/40 R; 106/308 N

[56] References Cited

U.S. PATENT DOCUMENTS

| | | | |
|---|---|---|---|
| 2,531,427 | 11/1950 | Hauser | 260/446 X |
| 3,014,001 | 12/1961 | Murray | 260/40 R X |
| 3,078,249 | 2/1963 | Russell | 260/40 R |
| 3,974,125 | 8/1976 | Oswald et al. | 260/864 X |

OTHER PUBLICATIONS

Jordan et al. (Jordan), *J. Phys. & Colloid Chem.* 5, 1196–1208 (1950).

*Primary Examiner*—Melvyn I. Marquis
*Attorney, Agent, or Firm*—Buell, Blenko, Ziesenheim & Beck

[57] ABSTRACT

A method and composition for control of rheological properties of polyester-styrene resin compositions is provided in which a smectite is reacted with a quaternary ammonium salt to provide a desired level of quaternary ammonium salt thereon and the treated smectite is added to a polyester-styrene resin mixture to produce a desired level of viscosity.

9 Claims, 4 Drawing Figures

RHEOLOGICAL CONTROL OF POLYESTER-STYRENE RESIN COMPOSITIONS

This invention relates to rheological control of polyester resin compositions and particularly to rheological control of such polyester compositions with organoclays optimized for the system.

Polyester-styrene compositions have found widespread use, particularly as gel coats, in the fabrication of a wide variety of products.

These compositions have found particular favor in the formation of fiberglass articles such as boats, automobile body parts and accessories.

It is widely recognized that polyester-styrene compositions have low viscosity and no thixotropy both of which are highly desirable qualities. It is equally well known that clays are generally hydrophobic and organophillic and are not readily mixed with organic systems.

We have discovered that polyester-styrene compositions are marked improved in their rheological properties by the addition of organoclays and particularly organoclays which have been optimized for the particular system. The organoclay may be incorporated into the polyester-styrene system either in the form of a pregel with styrene (which we prefer) or by direct addition.

The organoclays used in this invention are formed by the reaction of quaternary ammonium salts with a smectite in a water system.

The quaternary ammonium salts preferred by us include dimethyldialkylammonium halides and methylsulfates and dimethylbenzylalkylammonium halides and methylsulfate in which the alkyl group contains at least 10 carbon atoms. The quaternary ammonium salts specifically preferred by us for formation of organoclays to be used in this invention are dimethyldehydrogenatedtallowammonium and dimethylbenzylhydrogenatedtallowammonium.

The smectites are a group of expandable silicate minerals including montmorillonite, saponite, beidellite, hectorite and some mixed layer minerals. Smectites can be found in nature or they may be synthesized. They exhibit cation exchange capacity, the value of which depends somewhat upon the method of measurement. The cation exchange capacities of smectites as a group show a considerable range—from below 75 milliequivalents per 100 grams of clay to above 110 milliequivalents per 100 grams of clay.

Various levels of quaternary ammonium salts can be added to smectite. A certain amount, we have found, is reacted via cation exchange with the inorganic cations associated with the surface of the smectite. It is possible that all of the reaction is of this type when the level of addition is significantly below the cation exchange capacity. Above the cation exchange capacity, we have found that the quaternary ammonium compounds can be retained on the smectite by non-exchange methods. Monovalent inorganic cations on the surface of the smectite are more easily exchangeable by organic ions than are di or tri valent inorganic cations, consequently smectites with preponderantly monovalent inorganic exchange cations are preferred for our invention.

The practice and effectiveness of this invention will be most easily understood by reference to the following examples in which:

Example I gives directions for forming a dimethyldihydrogenatedtallowammonium montmorillonite at one treatment level. The organic level can be raised or lowered using similar procedures. Other dimethyldialkylammonium or dialkylbenzylalkylammonium smectites can be made using this procedure.

Example II describes forming a dimethylbenzylhydrogenatedtallowammonium montmorillonite using a different crude clay.

Example III gives the mode of incorporation of the organoclay in the polyester.

EXAMPLE I

An 8% slurry of bentonite mined in the Bates Park area of Natrona County, Wyoming, was screened, then passed through a laboratory centrifuge to produce a 5.22% slurry consisting essentially of montmorillonite particles less than 1 micron equivalent spherical diameter (esd). The cation exchange capacity, determined by the methylene blue spot test method, was 105 milliequivalent per 100 g. of dry clay. Then, 1916 g. of this slurry (containing 100 g. clay) was heated to 50° C. in a large beaker with stirring. Next, 75.9 g. of Adogen 442 (75% dimethyldihydrogenatedtallowammonium chloride and 25% isopropanol and water), a product of Ashland Chemical Company, was heated with 50 ml. isopropanol to approximately 60° C. This was added to the clay slurry. The reaction produced a noticeable thickening and flocs of waterimmiscible organoclay. After 30 minutes stirring, the slurry was filtered on a bench filter. The cake was dried 40 hours at 60° C. in a blower oven, then ground to less than 200 mesh in a micropulverizer.

Loss on ignition indicates the level of organic material retained.

EXAMPLE II

A 6.25% slurry of bentonite mined in the Kaycee area of Johnson County, Wyoming, was screened, then passed through a laboratory centrifuge to produce a 4.99% slurry consisting essentially of montmorillonite paticles less than 1 micron esd. The cation exchange capacity, determined by the methylene blue spot test method, was 89 milliequivalents per 100 g. dry clay. Approximately two liters of this slurry (containing 99.8 g. clay) was heated to 50° C. in a large beaker with stirring. Then 42.5 g. Ammonyx 856 (75% dimethylbenzylhydrogenatedtallowammonium chloride and 25% isopropanol and water), a product of Onyx Chemical Company, was heated with 50 ml. of isopropanol to approximately 60° C. This was added to the clay slurry. The reaction produced a noticeable thickening and flocs of water-immiscible organoclay. After 30 minutes stirring, the slurry was filtered on a bench filter. The cake was dried 40 hours at 60° C. in a blower oven, then ground to less than 200 mesh in a micropulverizer.

Loss on ignition indicates the level of organic material retained.

EXAMPLE III

The organoclay, 7.5 g., was slowly added to 100 g. styrene in an 8 oz. plastic cup over a period of 2 minutes. The material is stirred at low shear with a Hamilton Beach mixer during this time. After the additions are complete, mix at medium shear for one minute.

Now weigh 120 g. polyester (such as SR 2061, a product of PPG Industries) into an 8 oz. plastic cup. Add 48 g. of the styrene pregel as prepared above. (This amounts to 2% dry basis organoclay by weight to the polyester.) Mix on the Hamilton Beach mixer for 3 minutes at medium shear. Cover the container and store undisturbed.

Measure the viscosity 2 hours, then 19 hours after mixing the polyester and pregel with a Brookfield viscometer. First set the speed at 10 RPM, and read the dial after 2 or 3 revolutions; then set the speed at 100 RPM and read after 5 seconds.

The Thixotropic Index ("T.I.") (the viscosity at 10 RPM) is calculated.

The processes outlined in Examples I, II and III were repeated to provide different levels of quaternary ammonium salts on different clays. These differently treated clays were added to polyester-styrene compositions in the manner outlined in Example III and the viscosities determined at 2 and 19 hours. The results of these additions are set out in Tables I through IV and are illustrated graphically in FIGS. 1 through 4. These results show the importance of optimizing the treatment level of the organoclay prior to its addition to the polyester system. Of greatest importance is a high viscosity with an adequate thixotropic index, preferably above 2.5 .

TABLE I

Organoclay: Dimethyldihydrogenatedtallowammonium montmorillonite.
Montmorillonite source: Bates Park area, Natrona County, Wyoming.
CEC (cation exchange capacity) of montmorillonite: 105 meq./100 g.

| | Viscosity (cPs) | | | | | |
|---|---|---|---|---|---|---|
| | 2 Hours RPM | | | 19 Hours RPM | | |
| L.O.I. | 10 | 100 | T.I. | 10 | 100 | T.I. |
| 33.0 | 40 | 104 | 0.4 | settled | | — |
| 33.6 | 80 | 120 | 0.7 | settled | | — |
| 37.5 | 240 | 160 | 1.5 | 320 | 200 | 1.6 |
| 40.0 | 480 | 200 | 2.4 | 600 | 260 | 2.3 |
| 42.1 | 640 | 240 | 2.6 | 800 | 300 | 2.6 |
| 43.5 | 600 | 220 | 2.7 | 720 | 280 | 2.6 |
| Control | 104 | 140 | 0.7 | 120 | 156 | 0.8 |

TABLE II

Organoclay: Dimethylbenzylhydrogenatedtallowammonium montmorillonite.
Montmorillonite source: Bates Park area, Natrona County, Wyoming.
CEC of montmorillonite: 105 meq./100 g.

| | Viscosity (cPs) | | | | | |
|---|---|---|---|---|---|---|
| | 2 Hours RPM | | | 19 Hours RPM | | |
| L.O.I. | 10 | 100 | T.I. | 10 | 100 | T.I. |
| 28.2 | 112 | 144 | 0.8 | settled | | — |
| 29.5 | 136 | 192 | 0.7 | settled | | — |
| 31.7 | 400 | 192 | 2.1 | 480 | 240 | 2.6 |
| 33.6 | 440 | 200 | 2.2 | 800 | 280 | 2.9 |
| 35.0 | 600 | 240 | 2.5 | | | |
| 37.6 | 800 | 280 | 2.8 | 1400 | 440 | 3.2 |
| 39.2 | 780 | 342 | 2.3 | 860 | 364 | 2.4 |
| Control | 104 | 140 | 0.7 | 120 | 156 | 0.8 |

TABLE III

Organoclay: Dimethyldihydrogenatedtallowammonium montmorillonite.
Montmorillonite source: Kaycee area, Johnson County, Wyoming.
CEC of montmorillonite: 88 meq./100 g.

| | Viscosity (cPs) | | | | | |
|---|---|---|---|---|---|---|
| | 2 Hours RPM | | | 19 Hours RPM | | |
| L.O.I. | 10 | 100 | T.I. | 10 | 100 | T.I. |
| 32.6 | 800 | 300 | 2.7 | 1040 | 400 | 2.6 |
| 34.7 | 1000 | 332 | 3.0 | 1440 | 464 | 3.1 |
| 36.3 | 960 | 320 | 3.0 | 1880 | 468 | 3.8 |
| 37.4 | 880 | 280 | 3.1 | 1240 | 420 | 2.9 |
| 38.0 | 880 | 300 | 2.9 | 1200 | 408 | 2.9 |
| 38.8 | 880 | 300 | 2.9 | 1200 | 416 | 2.9 |
| 41.8 | 640 | 260 | 2.5 | 880 | 360 | 2.4 |
| 43.5 | 560 | 268 | 2.1 | 880 | 320 | 2.5 |
| Control | 80 | 110 | 0.7 | 80 | 110 | 0.7 |

TABLE IV

Organoclay: Dimethylbenzylhydrogenatedtallowammonium montmorillonite.
Montmorillonite source: Kaycee area, Johnson County, Wyoming.
CEC of montmorillonite: 89 meq./100 g.

| | Viscosity (cPs) | | | | | |
|---|---|---|---|---|---|---|
| | 2 Hours RPM | | | 19 Hours RPM | | |
| L.O.I. | 10 | 100 | T.I. | 10 | 100 | T.I. |
| 26.5 | 520 | 248 | 2.1 | 720 | 340 | 2.1 |
| 28.8 | 1200 | 376 | 3.2 | 1600 | 505 | 3.2 |
| 31.2 | 1200 | 424 | 2.8 | 1880 | 600 | 3.0 |
| 32.9 | 1200 | 400 | 3.0 | 1840 | 560 | 3.3 |
| 34.8 | 1000 | 376 | 2.7 | 1600 | 520 | 3.1 |
| Control | 80 | 110 | 0.7 | 80 | 110 | 0.7 |

The variation in viscosity with variation in % loss on ignition of the various organoclays is illustrated in the drawings in which.

Figure 1:
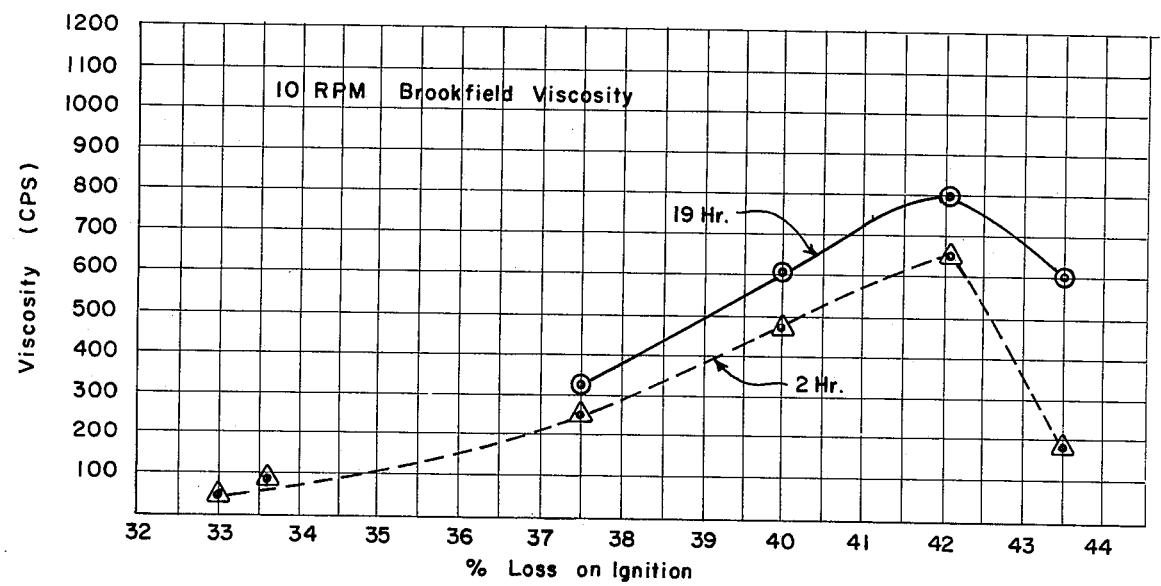
FIG. 1 illustrates variation in viscosity with % loss on ignition of the clay and polyester system of Table I.
Figure 2:
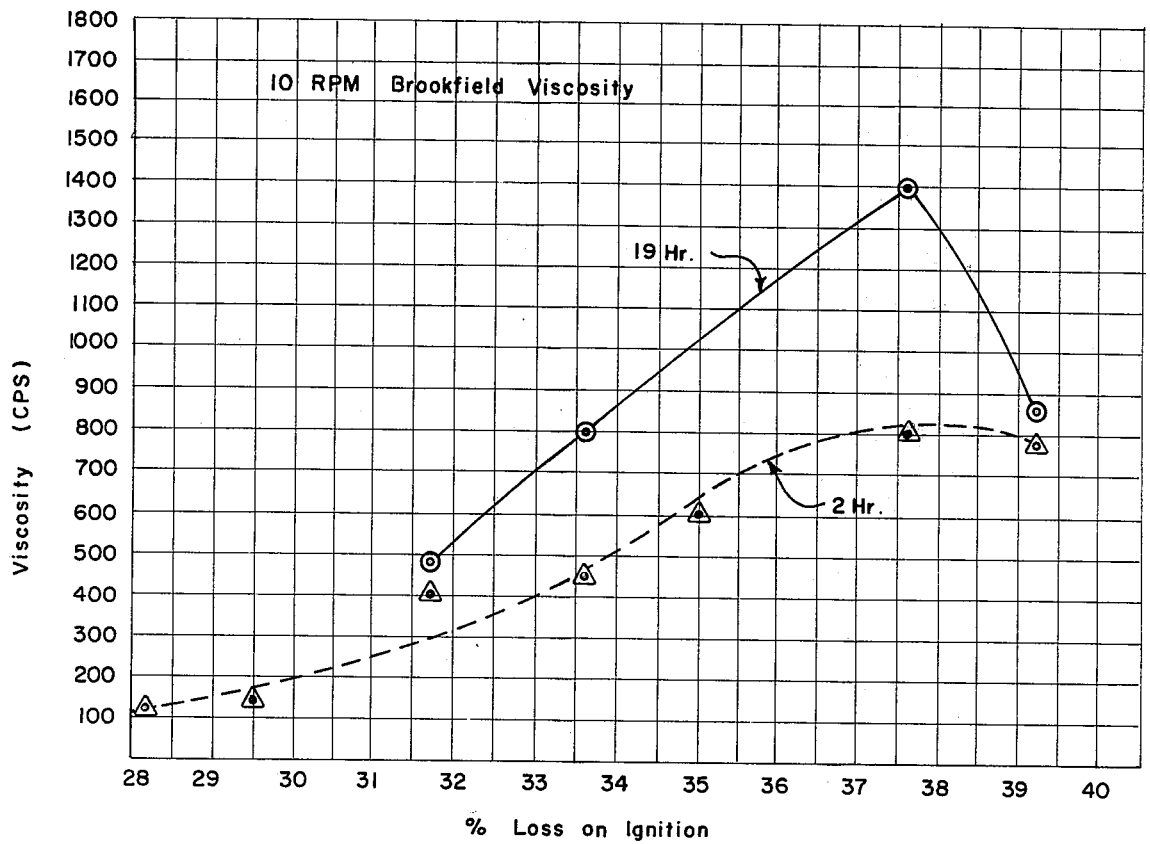
FIG. 2 illustrates variation in viscosity with % loss on ignition of the clay and polyester system of Table II.
Figure 3:
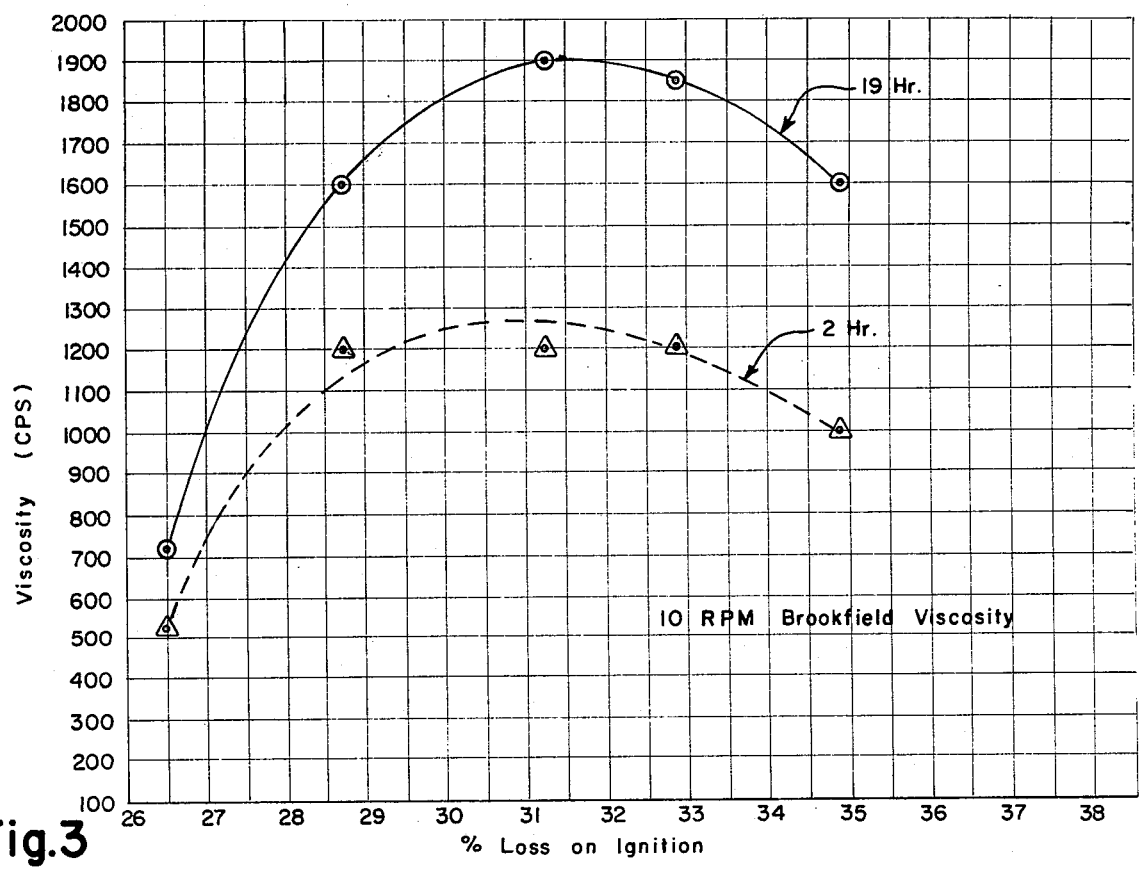
FIG. 3 illustrates the variation in viscosity with % loss on ignition of the clay and polyester system of Table III.
Figure 4:
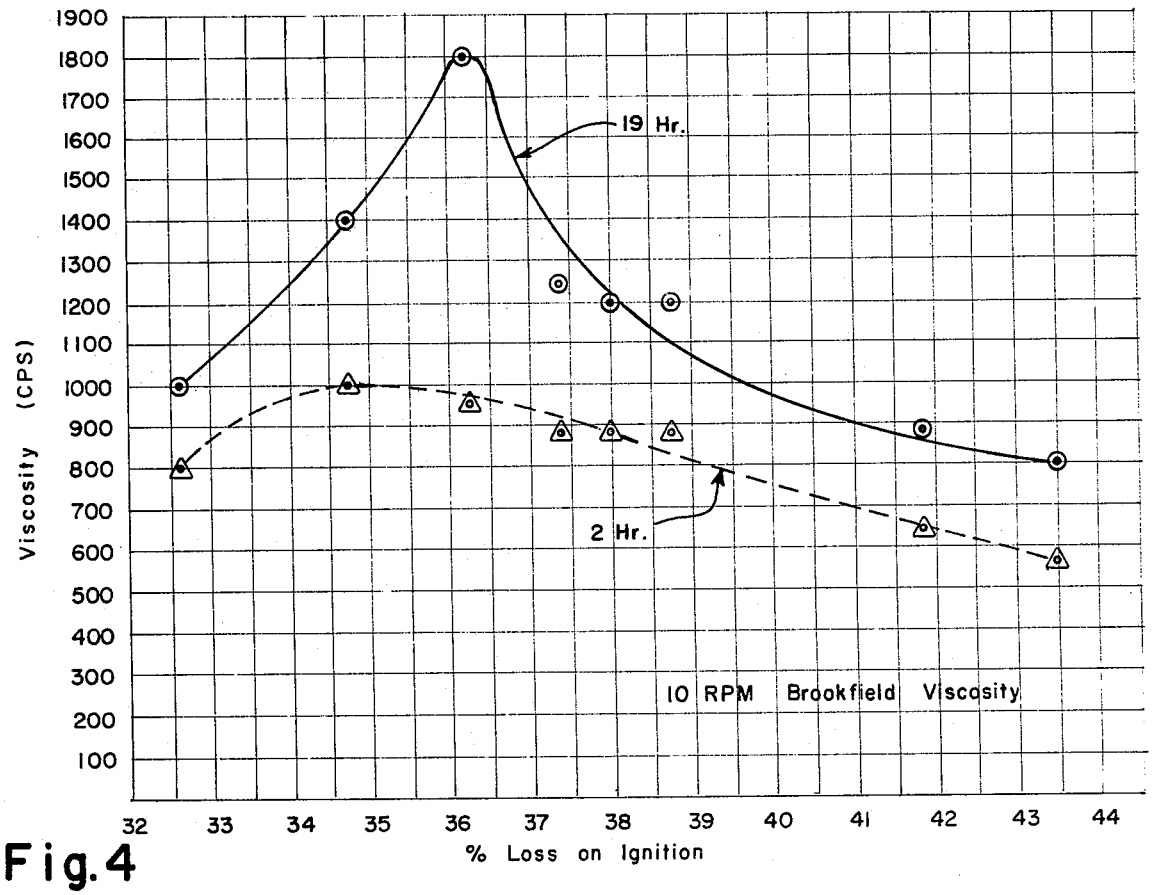
FIG. 4 illustrates the variation in viscosity with % loss on ignition of the clay and polyester system of Table IV.

The figures show most strikingly the significance of optimizing the organoclay treatment for the polyester system and illustrate how the polyester system can be selectively varied in viscosity to an optimum if desired.

While we have illustrated and described certain presently preferred embodiments and practices of this invention in the foregoing specification, it will be obvious that this invention may be otherwise embodied within the scope of the following claims.

We claim:

1. The method of controlling the rheological properties of polyester-styrene resin compositions comprising the steps of:
   (a) reacting dimethyl benzylhydrogenated tallow amine in varying amounts with a smectite in a water system to determine an optimum level of amine on said smectite to provide a desired viscosity in said polyester-styrene resin system and a thixotropic index above about 2.5, without regard to the ion exchange capacity of the smectite, (b) reacting the amine in the determined optimum with said smectite to provide a desired optimum level of dimethyl benzylhydrogenated tallow amine on said smectite, (c) recovering the resulting reaction product from the water system, and (d) adding the recovered reaction product to a polyester-styrene resin mixture to produce a desired level of viscosity.

2. The method of claim 1 wherein the level of quaternary ammonium salt is measured as loss on ignition.

3. The method as claimed in claim 1 wherein the reaction product is added directly to the polyester-styrene composition.

4. The method as claimed in claim 1 wherein the reaction product is first added to a small amount of styrene to form a pregel and the pregel is added to the polyester-styrene composition.

5. The method as claimed in claim 1 wherein the reaction product is added to the styrene component of the polyester-styrene composition to form a pregel prior to addition to the polyester.

6. The method as claimed in claim 1 wherein the optimum level of treatment for the clay is determined by varying the amount of quaternary ammonium salt on the smectite to determine the optimum level of viscosity and the clay is then treated to said optimum level to provide the desired reaction product.

7. A method as claimed in claim 1 wherein the quaternary ammonium salt is a member selected from the group consisting of dimethyldialkyl ammonium halides and methylsulfates and dimethylbenzylalkyl ammonium halides and methylsulfates.

8. A method as claimed in claim 7 wherein the alkyl group contains at least 10 carbon atoms.

9. A material adapted to control the rheological properties of polyester-styrene resin systems consisting of a reaction product of smectite and dimethyl benzylhydrogenated tallow amine, selected to produce a desired viscosity and a thixotropic index above about 2.5, without regard to the ion exchange capacity of the smectite.

* * * * *